United States Patent [19]

Tamez et al.

[11] Patent Number: 4,625,353
[45] Date of Patent: Dec. 2, 1986

[54] BRAKE ADJUSTMENT TOOL

[76] Inventors: Carlos Tamez; Miguel P. Castaneda, both of 3797 Mayland, Baldwin Park, Calif. 91706

[21] Appl. No.: 755,602

[22] Filed: Jul. 15, 1985

[51] Int. Cl.⁴ .............................................. B25F 1/00
[52] U.S. Cl. .......................................... 7/100; 7/138
[58] Field of Search ................. 81/478, 480, 481, 483, 81/176.1, 176.15, 177.7, 176.2, 177.75, 177.78, 488; 7/100, 138, 170; 188/196 M; 73/130, 131

[56] References Cited

U.S. PATENT DOCUMENTS

| | | | |
|---|---|---|---|
| 1,380,643 | 6/1921 | Eagle | 81/177.7 |
| 1,689,585 | 10/1928 | Hashart . | |
| 2,839,822 | 6/1958 | Dillingham et al. . | |
| 2,948,558 | 8/1960 | Schultz | 188/196 M |
| 3,063,315 | 11/1962 | Bernor et al. | 81/176.1 |
| 3,852,839 | 12/1974 | Blessing . | |
| 3,973,283 | 8/1976 | Boe . | |
| 4,104,935 | 8/1978 | Stoops | 81/177.2 |

Primary Examiner—Roscoe V. Parker
Attorney, Agent, or Firm—Sheldon & Mak

[57] ABSTRACT

A tool for adjusting a brake mechanism of a truck-trailer comprises a lever having a spanner at one end thereof for manually moving an actuating arm of the mechanism between released and actuated positions, and a plurality of socket members for turning an adjustment screw on the arm, the socket members being adapted to fit adjustment screws of different head configurations. A removeable socket member is provided on a swivel device for use on awkwardly located adjustment screws and for use with interchangeable sockets. A coupling for the removable socket member is capable of itself engaging a socket-headed adjustment screw. Turning the adjustment screw with the socket changes of the phase of the arm on the shaft for producing a desired amount of backlash in the brake mechanism.

12 Claims, 4 Drawing Figures

BRAKE ADJUSTMENT TOOL

BACKGROUND

The present invention relates to truck brake mechanisms, and more particularly to a tool for adjusting backlash in such mechanisms.

A typical brake mechanism for large trucks comprises a pneumatic actuator coupled by a crank to a shaft, the shaft operating a brake shoe against a brake drum of a wheel of the truck. The brake shoe is biased away from contact with the drum. When the brakes are applied, the actuator is required to move a backlash distance corresponding to the clearance between the shoe and the drum before braking begins. Insufficient backlash causes dragging and overheating of the brakes. Excessive backlash introduces an undesirable delay in brake application and wastes precious high pressure air.

An adjustment screw is commonly provided on the crank for adjusting the backlash by changing the angular position, or phase, of the crank on the shaft. The adjustment is performed by turning the screw by means of a wrench. The adjustment is checked by comparing the distance moved by a connecting rod of the actuator between application and release of the brakes with a range of allowable backlash.

The importance of proper adjustment of truck brake mechanisms to trucking safety is recognized in that many states enforce a maximum limitation of the allowable brake mechanism backlash by in-route inspections, refusing further operation of offending rigs until they are properly adjusted.

A problem with the conventional adjustment provisions of the prior art is that two people are required to make the adjustment. A first person must observe the movement of the actuator and, if necessary, turn the adjustment screw, and a second person must apply and release the brakes of the truck. Several disadvantages are associated with this problem, for example:

1. The involvement of the second person is wasteful of manpower;
2. The first person risks injury in case the brakes are inadvertently operated while he is performing the adjustment, especially when the brake mechanism is in an awkward location and/or located far from the cab of the truck.
3. The inspection and/or adjustment is not possible when only one person is available, often the case when the truck is in route; and
4. The inspection and/or adjustment is not possible if the pneumatic power system is not operative, such as when a trailer having brakes to be serviced is not coupled to a tractor.

Another problem with the adjustment provisions of the prior art is that the adjustment screws are not standarized. As many as four different adjustment screw configurations are possible on a single rig comprising a tractor, two trailers, and a pair of bogie wheels, even when all the adjustment screws of a single unit are alike. The different screw configurations include variations in the location and orientation of the screw, as well as variations in both head size and type. Thus an assortment of wrenches must be carried by a person required to service the different truck brakes.

There is a need, therefore, for a tool for inspecting and adjusting truck brakes having any of several adjustment screw configurations and that can be safely used by an unassisted person without requiring pneumatic powered activation of the brakes.

SUMMARY

The tool of the present invention meets this need by providing a socket wrench combined with a spanner for engaging a crank of a brake mechanism for manually operating and releasing the brake mechanism. The tool comprises a lever having first and second ends, a spanner attached to the first end of the lever, the spanner comprising a pair of bearing members extending laterally from opposite ends of a bar for engaging opposite sides of the arm for turning the shaft by the lever without applying brake system power, and a head engagement member fastened to the lever for adjusting the screw.

Preferably the spanner is removably coupled to the lever for obtaining a plurality of angular orientations of the spanner with respect to the lever. Thus a person using the tool can select whatever angular orientation of the spanner is most effective for turning the shaft in a given application.

Preferably at least one of the bearing members of the spanner has a hook portion for laterally stabilizing the lever when the spanner is engaging the arm.

The spanner can be provided as an attachment for a conventional breakdown bar, the breakdown bar functioning as the lever of the tool.

Preferably the tool includes a plurality of the engagement members for engaging the adjustment screw of each of a plurality of brake mechanisms, the adjustment screw of at least some of the brake mechanisms having head means requiring different sockets for turning the screw.

Preferably at least one of the engagement members is removable. Preferably the removable engagement member is at the second end of the lever, pivotably mounted for reaching awkwardly located adjustment screws. Preferably the removable engagement member is attached by a protruding square coupling on the lever, the coupling being capable of engaging and turning a socket-headed screw. The removable engagement member can be selected from a set of interchangeable sockets.

The present invention provides a method for adjusting a brake mechanism having an operating shaft rotated by an arm in response to movement of a piston between a released position and an actuated position under external power, the arm having a screw for adjusting the phase of the arm on the shaft, the method comprising the steps of:

a. selecting a tool comprising:
  (i) a lever having a first end and a second end;
  (ii) a spanner attached to the first end of the lever, the spanner comprising a bar having first and second bearing members extending laterally from opposite ends thereof for engaging opposite sides of the arm for turning the shaft by means of the lever without applying the external power; and
  (iii) a head engagement member for adjusting the screw, the engagement member being fastened to the lever;
b. engaging the spanner with the arm for turning the shaft;
c. turning the shaft from the released position to the actuated position by means of the lever;

d. observing a first distance traveled by the piston during movement of the shaft between the released position and the engaged position;

e. coupling the engagement member with the adjustment screw; and f. turning the adjustment screw for producing a predetermined second distance traveled by the piston between the released position and the engaged position of the shaft.

DRAWINGS

These and other features, aspects, and advantages of the present invention will become better understood with reference to the following description, appended claims, and accompanying drawings where:

FIG. 1. is an oblique elevational prospective view of the tool of the present invention, a removable spanner portion of the tool shown separated from a lever portion of the tool;

DESCRIPTION

Figure 2:
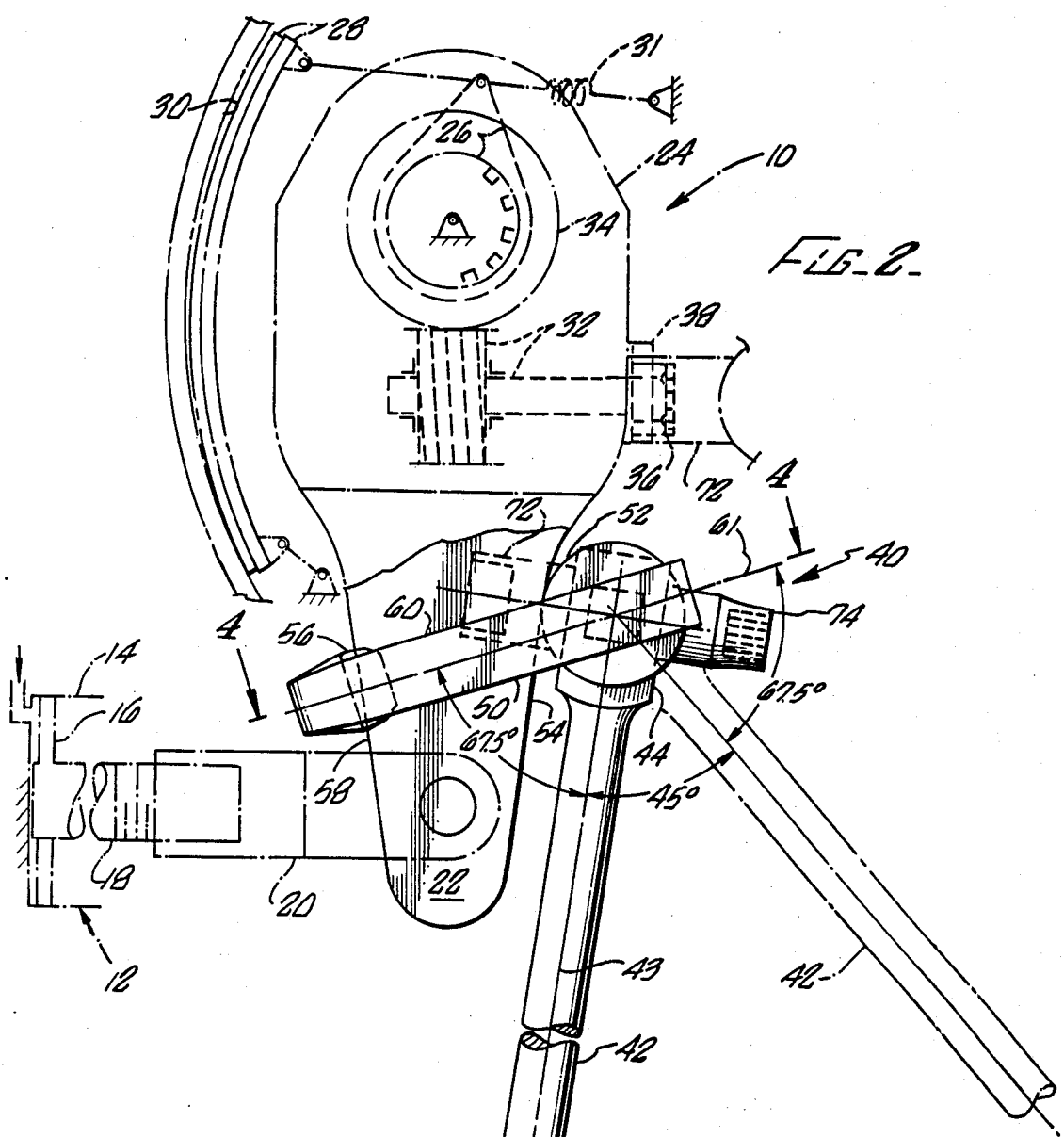
FIG. 2 is a side elevational view of the tool of FIG. 1 engaging a crank arm of a brake mechanism.

The present invention is directed to a combination tool for inspecting and adjusting truck brake mechanisms. With reference to FIG. 2, a conventional brake mechanism 10 comprises a pneumatic actuator 12 having a stationary cylinder 14 and a movable piston 16 on a connecting rod 18. The connecting rod 18 is coupled by a clevice 20 to an arm 22 of a crank device 24. The crank device 24 is rigidly connected to a crankshaft 26 for moving a brake shoe 28 into contact with a brake drum 30 when external pressure is applied to the pneumatic actuator 12. A spring 31 biases the shoe 28 away from the drum 30, collapsing the actuator 12 when the external pressure is removed. The acutator 12 and the connection of the brake shoe 28 to the crank shaft 26 are shown schematically in the drawings.

An adjustment screw 32 is connected within the crank device 24 to an adjustment ring 34 for adjusting the angular position, or phase, of the arm 22 on the crank shaft 26. The screw 32 has a polygonal head 36 for engagement by a suitable wrench (described below). Rotation of the screw 32, in many cases, is prevented by a biased keeper 38 that retracts when the wrench is engaged for permitting rotation of the screw 32.

The screw 32 permits adjustment of a backlash distance traveled by the rod 18 between a first position when the actuator 12 is collasped and a second position when the shoe 28 is firmly in contact with the drum 30.

The brake mechanism 10 can include a safety device (not shown) whereby the brakes are maintained in an activated condition unless system air pressure is present. Such a safety device is conventionally standard equipment on a truck trailer for preventing movement of the trailer when it is not coupled to a tractor. An auxiliary source of pressurized air (shop air) can be used for releasing the trailer brakes for servicing the trailer without coupling it to a tractor. In this specification, the safety device, when present, is assumed to be pressurized for releasing the brakes.

With reference to FIGS. 1-4, a tool 40 for inspecting and adjusting the mechanism 10 according to the present invention comprises a lever 42 having a first end 44 and a second end 46 on a lever axis 47. A handle 48 is provided on the lever 42 proximate to the second end 46. A spanner 50 is attached to the first end 44 of the lever 42 for engaging the arm of the crank device 24.

The spanner 50 includes a boss 52 for bearing against a first side 54 of the arm 22, a hook member 56 for bearing against a second side 58 of the arm 22, and a bar 60 connecting the hook member 56 to the boss 52, the bar having a bar axis 61. The hook member 56 and the boss 52 project laterally from a face 62 of the bar 60 for providing clearance for the arm 22 between the hook member 56 and the boss 52.

Figure 1:
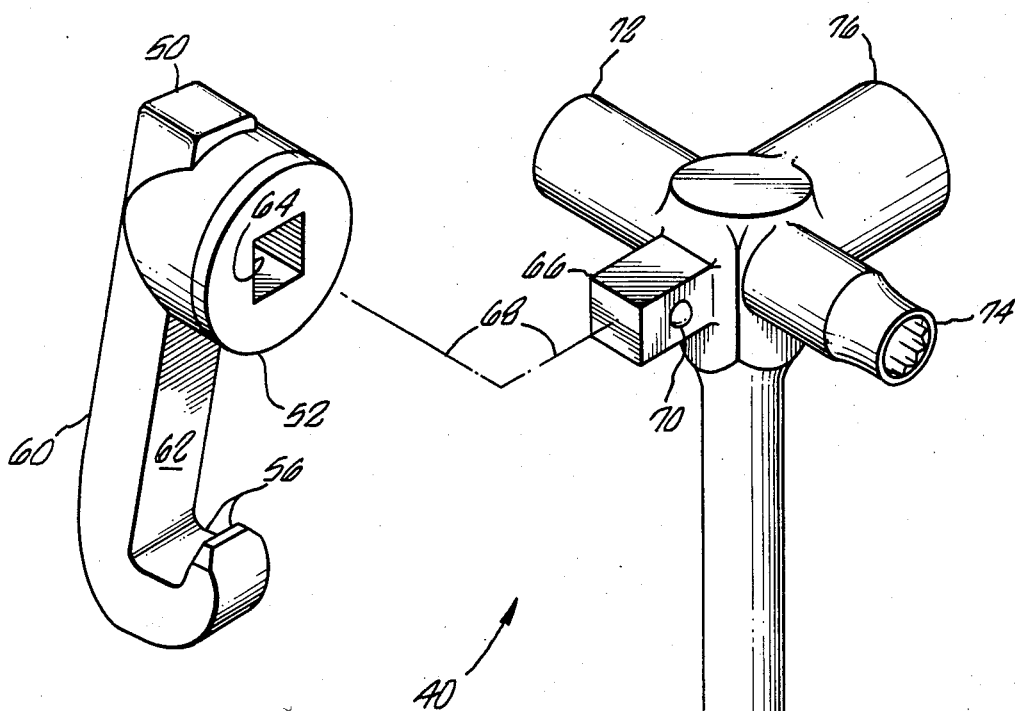
Figure 4:
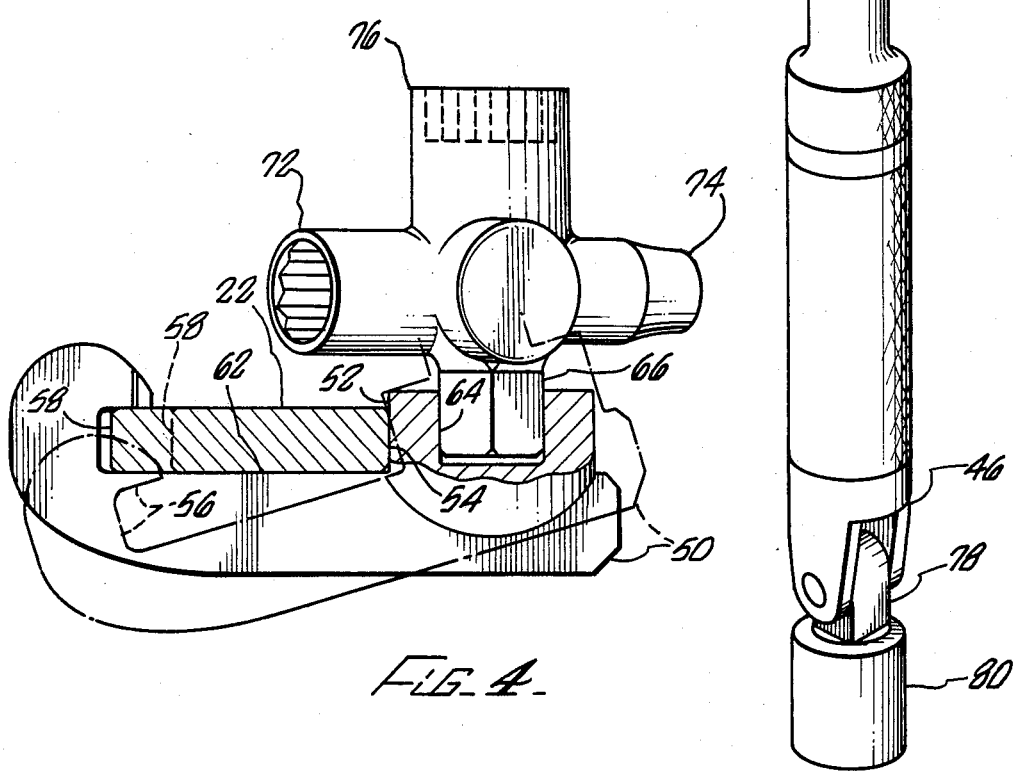
FIG. 4 is a fragmentary sectional plan view of the tool of FIG. 1 taken along line 4—4 in FIG. 2.
Figure 3:
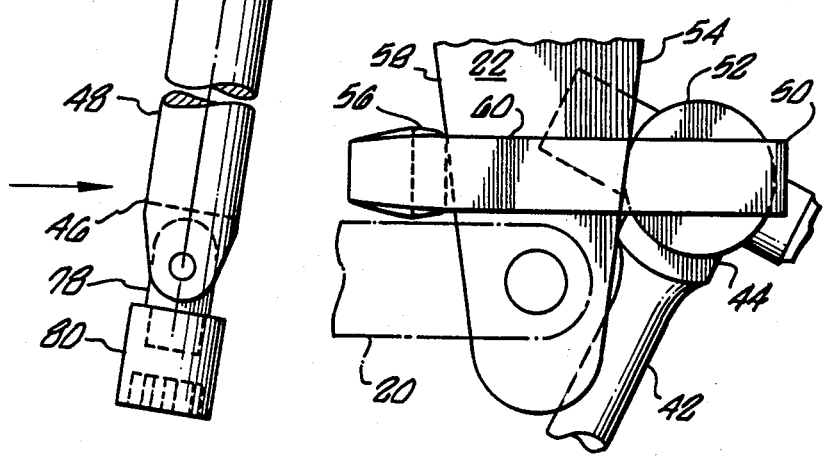
FIG. 3 is a fragmentary elevational view of the tool of FIG. 2 showing how the tool engages the arm.

With reference to FIGS. 3 and 4, the tool 40 is engaged with the arm 22 by placing the boss 52 in contact with the first side 54 of the arm 22, then moving the hook member 56 past the second side 58 at a point located between the clevice 20 and the crankshaft 26 proximate to the clevice 20, thereby bringing the face 62 of the bar 60 against the arm 22. Then, by moving the handle 48 in a direction away from the acutuator 12, the hook member 56 contacts the second side 58 of the arm 22. Thus engaged, the tool 40 permits manual operation of the brake mechanism 10 by further movement of the handle 48 in a direction away from the actuator 12.

The combination of the boss 52, the hook member 56, and the face 62 of the bar 60 contacting the arm 22 stabilizes the lever 42 against movement in a direction parallel to the crank shaft 26 for facilitating the manual operation of the brake mechanism 10.

Preferably the spanner 50 is removably attached to the lever 42 for permitting a plurality of orientations of the handle 48 with respect to the bar 60 and for other advantages described below. A polygonal cylindrical cavity 64 in the boss 52 engages a corresponding polygonal cylindrical driver 66 on an engagement axis 68, the engagement axis 68 being perpendicular to both the lever axis 47 and the bar axis 61. A ball 70 is mounted in the driver 66, biased outwardly in a conventional manner against the cavity 64 for yieldingly holding the spanner 50 in engagement with the lever 42.

Preferably the driver 66 forms a conventional half-inch square male coupling for interchangeably substituting standard half-inch drive wrench sockets in place of the spanner 50. Thus the lever 42 can function as a wrench handle for general maintenance as well as for driving the spanner 50.

Preferably the cavity 64 is oriented rotationally with respect to the engagement axis 68 for permitting the spanner 50 to be engaged at an angle of about 67.5° between the lever axis 47 and the bar axis 61. Thus, when the tool 40 engages the arm 22, the handle 48 is located in a preferred orientation proximately in line with the arm 22 for maximum mechanical advantage in moving the arm 22 by means of the tool 40, as shown in FIG. 2.

If insufficient clearance exists for the lever 42 in the preferred orientation, the spanner 50 can be removed from the lever 42 and engaged in another orientation at right angles to the preferred orientation. Moreover, a first set of four orientations is produced, spaced 90° apart.

An unexpected advantage of the orientation of the cavity 64 corresponding to the 67.5° angle between the lever axis 47 and the bar axis 61 is that, by relocating the spanner with the bar 60 passing behind the arm 22, a second set of four possible angular positions of the lever 42 with respect to the arm 22 is obtained, the second set being oriented 45° from the first, shown in FIG. 2 by the dashed lines indicating the lever 42. Thus, even with the square drive engagement of the spanner 50 with the lever 42, eight approximately equally spaced orientations of the lever 42 are possible when the tool 10 is engaged with the arm 22. Consequently, the tool 40 enables convenient manual operation of many truck brake mechanisms, even when space is limited in the vicinity of the arm 22.

A first socket member 72 is fastened to the first end 44 of the lever 42 for turning the head 36 of the screw 32 for adjusting the backlash of the brake mechanism 10. If necessary, the spanner 50 can be removed from or repositioned on the lever 42 for permitting the first socket member 72 to be engaged with the head 36.

Preferably a second socket member 74, and a third socket member 76 are also fastened to the first end 44 of the lever 42, each of the socket members 72, 74 and 76 being of a different size for use as a wrench for engaging a head 36 of a corresponding size. The socket members 72, 74, and 76 are of conventional 12-point female configuration in sizes 9/16, ⅝, and ¾ inch, respectively, for convenient engagement with a head 36 of solid hexagonal shape and corresponding size, these sizes being commonly encountered.

Preferably the second end 46 of the lever 42 is provided with a swivel coupling 78 for interchangeably mounting a wrench socket 80 in an angularly variable relationship to the lever 42 for turning the adjustment screw 32 when the head 36 thereof is especially awkward to reach, and/or when the head 36 is of a size not corresponding to any of the socket members 72, 74 and 76. The wrench socket 80 is of 8-point female configuration, ½ inch in size for engaging a solid ½ inch square head 36 that is sometimes encountered.

Preferably the swivel coupling 78 is of three-eighths-inch square drive configuration for engaging, with the wrench socket 80 removed, a ⅜ inch square socket head 36 (female) that is sometimes encountered. The wrench socket 80 is thus interchangeable with standard three-eighths-inch drive sockets. Thus the tool 40 permits convenient adjustment of many of the existing brake mechanisms 10, notwithstanding the variety of head configurations and sizes manifested in the head 36 of the adjusting screw 32. The tool 40 also conveniently provides a single means for turning both half-inch and three-eighths-inch drive sockets.

In use, the tool 40 is engaged with the arm 22 and manipulated for manually operating the brake mechanism 10 as described above. A first backlash distance traveled by the rod 18 (and the piston 16) during the manual operation is noted and compared with a desired backlash distance (or a range of permitted backlash). The tool 40 is next disengaged from the arm 22 and engaged with the screw 32 by connecting a corresponding one of the socket members 72, 74, 76, the wrench socket 80, and the swivel coupling 76 to the head 36 thereof, simultaneously retracting the keeper 38 (if present). The socket members 72, 74, 76, the wrench socket 80, and the swivel coupling 78 thus function as head engagement members in the present invention.

The tool 40 is then manipulated for turning the screw 32 for producing a second backlash distance corresponding to the desired backlash distance. Finally, the tool 40 is again engaged with the arm 22 for checking the second backlash distance against the desired backlash. If necessary, the adjustment of the screw 32 is repeated.

Thus one person using the tool 40 can easily adjust the brake mechanism 10 without having to carry a large assortment of tools. A significant cost savings is realized because a second person operating the brake mechanism 10 from the cab of the truck is no longer required. Moreover, the single person is not subjected to unexpected, inadvertent operation of the brakes by a second person remotely located in the cab where communication is unreliable, making the job safer.

Although the present invention has been described in considerable detail with reference to certain preferred versions thereof, other versions are possible. For example, the swivel coupling 78 can be replaced by a rigid coupling, fixed at right angles to the lever 42. Alternatively, the wrench socket 80 can be permanently attached to the second end 46 of the handle 42. Moreover, other sizes and configurations of the socket members can be substituted. Therefore, the spirit and scope of the attended claims should not necessarily be limited to the description of the preferred versions contained herein.

What is claimed is:

1. A tool for adjusting a brake mechanism the brake mechanism comprising a crank device for turning a brake operating shaft between a released position and an actuated position in response to movement of a piston under external power, the crank device having an arm and an adjustment screw for changing the phase of the shaft with respect to the piston, the tool comprising:
   a. a lever having a first end and a second end;
   b. a spanner attached to the first end of the lever, the spanner comprising a bar having first and second bearing members extending laterally from opposite ends thereof for engaging opposite sides of the arm for turning the shaft by means of the lever without applying the external power; and
   c. a head engagement member for turning the screw, the engagement member being fastened to the lever.

2. The tool of claim 1 wherein at least one of the bearing members of the spanner includes a hook portion for laterally stabilizing the lever when the spanner is engaging the crank device.

3. The tool of claim 1 including coupling means between the spanner and the lever for removably securing the spanner in one of a plurality of angular positions with respect to the lever.

4. The tool of claim 3 in which there are four of the angular positions of the spanner with respect to the lever, equally spaced at 90°, one of the positions being at an angle of about 67.5° for providing a plurality of angular positions of the lever spaced about 45° apart with respect to the arm.

5. A tool for adjusting each of a plurality of brake mechanisms, each mechanism comprising a crank device for turning a brake operating shaft between a released position and an activated position in response to movement of a piston under external power, the crank device having an arm and an adjustment screw for changing the phase of the shaft with respect to the piston, the adjustment screw having a head for engaging turning means, the head of at least some of the brake mechanisms requiring different turning means, the tool comprising:
   a. a lever having a first end and a second end;
   b. a spanner attached to the first end of the lever, the spanner comprising a bar having first and second bearing members extending laterally from opposite ends thereof for engaging opposite sides of the arm for turning the shaft by means of the lever without applying the external power; and c. a plurality of head engagement members for turning each of the screws, the engagement members being fastened to the lever.

6. The tool of claim 5 including coupling means between the spanner and the lever for removably securing the spanner in one of a plurality of angular positions with respect to the lever.

7. The tool of claim 5 wherein at least one of the bearing members of the spanner includes a hook portion for laterally stabilizing the lever when the spanner is engaging the crank device.

8. The tool of claim 5 wherein at least one of the engagement members is removable.

9. The tool of claim 8 having a protruding square coupling member for attaching the removable engagement member, the square coupling member being capable of engaging and turning a socket-headed screw.

10. The tool of claim 8 wherein the removeable engagement member is at the second end of the lever, the tool including means for swiveling the removeable engagement member.

11. A tool for adjusting each of a plurality of brake mechansims, each mechansim comprising a crank device for turning a brake operating shaft between a released position and an activated position in response to movement of a piston under external power, the crank device having an arm and an adjustment screw for changing the phase of the shaft with respect to the piston, the adjustment screw having a head for engaging turning means, the head of at least some of the brake mechanisms requiring different turning means, the tool comprising:

a. a lever having a first end and a second end;

b. a spanner attached to the first end of the lever, the spanner comprising a bar having first and second bearing members extending laterally from opposite ends thereof for engaging opposite sides of the arm for turning the shaft by means of the lever without applying the external power; and c. coupling means between the spanner and the lever for removably securing the spanner in one of a plurality of angular positions with respect to the lever;

d. a plurality of head engagement members for turning each of the screws, the engagement members being fastened to the lever, at least one of the engagement members being removably located at the second end of the lever; and e. a protruding square coupling member for attaching the removeable engagement member, the square coupling member being capable of engaging and turning a socket-headed screw, the coupling member including means for swiveling the removable engagement member.

12. A method for adjusting a brake mechanism, the brake mechanism comprising a crank device for turning a brake operating shaft between a released position and an actuated position in response to movement of a piston under external power, the crank device having an arm and an adjustment screw for changing the phase of the shaft with respect to the piston, the method comprising the steps of:

a. selecting a tool comprising:
   (i) a lever having a first end and a second end;
   (ii) a spanner attached to the first end of the lever, the spanner comprising a bar having first and second bearing members extending laterally from opposite ends thereof for engaging opposite sides of the arm for turning the shaft by means of the lever without applying the external power; and
   (iii) a head engagement member for adjusting the screw, the engagement member being fastened to the lever;

b. engaging the spanner with the arm for turning the shaft;

c. turning the shaft from the released position to the actuated position by means of the lever;

d. observing a first distance traveled by the piston during movement of the shaft between the released position and the engaged position;

e. coupling the engagement member with the adjustment screw; and f. turning the adjustment screw for producing a predetermined second distance traveled by the piston between the released position and the engaged position of the shaft.

* * * * *